M. L. KAPLAN.
GALVANIC CELL.
APPLICATION FILED NOV. 20, 1914.
1,221,062.
Patented Apr. 3, 1917.
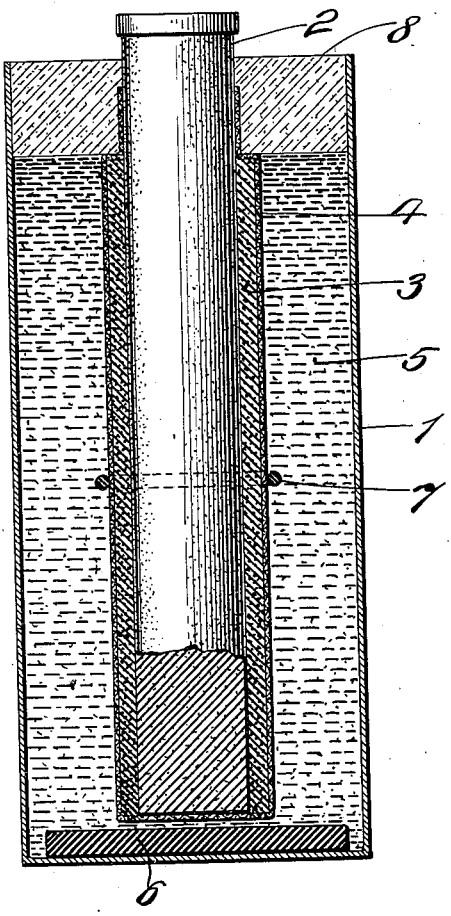
WITNESSES:
INVENTOR:
Morduch L. Kaplan,
BY
Charles C. Gill,
ATTORNEY.

UNITED STATES PATENT OFFICE.

MORDUCH L. KAPLAN, OF BROOKLYN, NEW YORK, ASSIGNOR TO BEACON MINIATURE ELECTRIC CO., INC., OF NEW YORK, N. Y., A CORPORATION OF NEW YORK.

GALVANIC CELL.

1,221,062.  Specification of Letters Patent.  Patented Apr. 3, 1917.

Application filed November 20, 1914. Serial No. 873,137.

*To all whom it may concern:*

Be it known that I, MORDUCH L. KAPLAN, a citizen of the United States, and a resident of Brooklyn, in the county of Kings and State of New York, have invented certain new and useful Improvements in Galvanic Cells, of which the following is a specification.

This invention relates to galvanic cells of the Leclanché type consisting of a negative zinc pole, a positive carbon pole, an electrolyte containing ammonium chlorid or other ammonium salts, and the like, and a depolarizing mass comprising powdered graphite or other form of conducting carbon, incorporated with an oxid of manganese of peculiar qualities and high efficiency as a depolarizing agent and relates in particular to dry cells or batteries, especially the form known as the miniature dry cell; as more particularly hereinafter described in detail and set forth in the appended claims.

It is customary to make use of manganese peroxid as a depolarizing agent in cells of the Leclanché type, the natural peroxid such as pyrolusite commonly being used for the purpose, although an artificial form of the peroxid containing water of hydration which form is obtained by precipitation, with reagents, of the peroxid from solutions of manganese compounds also has been employed to some extent. While both of these materials are more or less useful in the manufacture of large stationary units, they are not as well adapted for use in the production of the miniature dry cell. The natural mineral manganese is difficult to grind to as fine a degree as is desired and the precipitated manganese material, although finely divided, is commonly very bulky; due no doubt to its water of hydration, so that depolarizing material, in a sufficient quantity can scarcely be crowded into the small space available for the depolarizing element. Furthermore the hydrate water lowers the percentage of active oxygen. Thus while these materials may be used in the larger or stationary units of the Leclanché type, they are not well adapted for the production of the very compact form of dry cell, known as miniature, which is used very largely for making pocket flash lights and the like which necessarily must have high depolarizing efficiency in order to secure the continuous satisfactory performance of the cell.

According to my invention a form of the higher oxid of manganese may be utilized which apparently consists of manganese in two or more stages of oxidation and in some peculiar form or condition whereby very satisfactory depolarizing action is secured and whereby it becomes possible, due to the high specific gravity of the material in its preferred form, to concentrate and compact finely-divided graphite or other suitable form of conducting carbon with such a quantity of the depolarizing compound that long life of the cell is assured and a high current output is effectively developed over a relatively long period of time.

While ordinarily, the presence of lower oxids of manganese is undesirable, it appears under the present circumstances that a lower oxid in some form is desirable or essential to the operative qualities of the product and it further appears that manganese oxid in a lower form of oxidation in some peculiar form of combination with the higher oxid, secures or assures a novel depolarizing action. When the lower oxid is thus combined with the higher to yield a complex manganese compound there results a certain measure of transference of oxygen from the interior to the exterior, so that depolarizing efficiency does not depend merely on the surface exposure but also on the gross amount of the manganese compound. Thus it becomes possible to use a manganese depolarizer of a density heretofore thought to be unfeasible, especially from the standpoint of the artificially prepared product, because the catalytic or analogous action of the lower oxid of manganese, serves in some peculiar way to convey oxygen from the inner to the outer portions of the particle, or to act in some equivalent manner and thus enables the complete or substantially complete utilization of the manganese depolarizing compound in a manner most advantageous for the type known as the miniature dry cell.

A form of manganese depolarizer which is adapted to be used in accordance with the present invention may be prepared according to the following illustrative example which represents my invention in its preferred embodiment. Manganous carbonate MnCO₃ is heated in the presence of air or oxygen in order to oxidize the manganous carbonate to a considerable degree and the oxidation is then completed up to the desired measure of oxidation, by the action of a powerful oxidizing agent such as a solution of permanganate of potash or soda. The degree of oxidation by the action of air varies considerably according to circumstances and consequently the amount of permanganate or other oxidizing agent such as would be used may be determined by chemical control; that is to say, the air-oxidized material is analyzed and sufficient permanganate employed to raise the degree of oxidation to the required point. As to this final degree of oxidation, I do not limit myself to any precise proportions, but have found a product containing approximately ten molecules of manganese peroxid to one molecule of manganous oxid is well adapted for the purpose, and the formula corresponding to such compound being $10MnO_2.MnO$. Although as indicated it would appear that the manganese peroxid and the manganous oxid are in combination, it is difficult to state just what the form of combination is and hence I content myself with setting forth the foregoing formula merely as illustrative, and as representing a new class of the higher oxids of manganese seemingly containing a catalytic material which enables the action of auto-oxidation or auto-reduction to be consummated. Also, it is possible to prepare such a compound in a practically anhydrous condition and in this form it appears that the reactions involved progress with great regularity and uniformity, apparently enabling oxygen to be brought from the inner part of the fragment or particle to its surface, where the process of depolarization takes place, thus bringing about the full measure of particle or fragment reduction of such compact anhydrous manganese material.

In making up the miniature dry cell the following conditions generally obtain when using the present form of material. The manganese depolarizing compound is mixed with finely-divided graphite and after preferably being moistened with the electrolyte is formed into a compact block or mass by molding under pressure around a rod or pencil of carbon. The carbon electrode with its enveloping mass of shaped or molded depolarizing and conducting material supported by and in electrical contact with it is wrapped in a tissue such as cloth and is placed pendant in a zinc container forming the negative electrode and which also serves to hold a viscous, gelatinous or pasty mass serving as the electrolyte and commonly containing ammonium chlorid. The use of an electrolyte or exciting composition of this consistency is of especial utility when a depolarizer of this character is employed. The top of the zinc container is then suitably sealed or plugged.

Owing to the fact that the manganese material prepared in this manner has little or no conducting power for the electric current it is necessary to use a substantial amount of graphite or similar conducting material in order to prevent so high an internal resistance that the output of the battery is affected and an excess of the manganese material over the graphite preferably should be used; that is, the amount of the graphite in fact preferably exceeding the ratio of 3:2 and to that end I prefer to employ finely-divided or powdered graphite in the proportion of ten parts of graphite to seventeen parts of the manganese compound, which I find in the case of the miniature dry cell enables the internal resistance of the cell to be such that in conjunction with the effective depolarizing action of the compact manganese material very efficient results are secured.

A further precaution which should be taken, especially when concerned with the manufacture of the miniature dry cell is that of extracting the prepared manganese depolarizing compound with dilute acid, so as to remove traces of salts and possibly manganous bodies, as manganous oxid etc. The acid extracted material has been found by me to be more satisfactory from the standpoint of absence of local action. If deterioration occurs on standing in the case of the miniature dry cell the loss in current output is speedily noticed and it is important in the case of these small dry cells to take the precaution that the depolarizer remains in good condition in the finished cell when standing unused as when in storage over a long period of time, for, owing to the smallness of the electrode and the hard service expected of the miniature cell, any deterioration by local action is speedily felt. The acid extraction removes manganous oxid or other bodies which probably have a deteriorating effect enabling a product to be obtained which does not possess the objectionable feature referred to above, and which appears as a compact, finely-divided substantially anhydrous higher oxid of manganese product capable of undergoing effective depolarizing reduction throughout its mass.

While I have referred particularly to a highly reactive depolarizer of anhydrous nature I do not limit myself thereto, but may employ somewhat hydrated products, provided the material is of such specific gravity as not to undesirably influence the electrical output.

The accompanying drawing shows in vertical section the organization of the battery of the present invention. In the drawing 1 is a zinc container in which is situated the carbon pencil 2. 3 is the depolarizing material of the character hereinbefore described. 4 is a cloth sack or wrapping in close contact with the depolarizing mass and fastened to the carbon pencil in its upper part. 5 is the exciting liquid containing ammonium chlorid as the active agent and having a pasty or gelatinous consistency due to the presence of a thickening agent. 6 is insulating material which is placed in the bottom of the zinc container, and a ring of rubber 7 serves to insulate the carbon rod and keep the depolarizing mass from contact with the walls of the container. 8 is a mass of waxy sealing material. The active manganese depolarizing material is of such a compact nature that the depolarizing mixture occupies a relatively small amount of space so that the carbon rod is spaced only at a short distance from the walls of the zinc electrode, thereby reducing internal resistance to a minimum.

What I claim is:

1. In a dry battery, a depolarizing agent comprising a mixture of finely-divided carbon and incorporated but chemically uncombined therewith a larger proportion of manganese depolarizing material comprising a roasted compact substantially anhydrous artificial higher oxid of manganese product, substantially free from water-soluble bodies capable of causing local action and having less combined oxygen than corresponds to the formula $MnO_2$.

2. In a battery of the Leclanché type, a depolarizing agent comprising finely-divided graphite and therewith incorporated manganese depolarizing material comprising an ignited substantially anhydrous artificial higher oxid of manganese substantially free from water-soluble salts capable of causing local action; said oxid of manganese being present in the proportion of at least three parts to two parts of graphite.

3. In a miniature dry battery, a depolarizing agent comprising about ten parts of finely-divided carbon and about seventeen parts of substantially anhydrous artificial manganese peroxid substantially free from bodies causing local action.

4. In a dry battery, a depolarizing agent comprising a mixture of finely-divided carbon and an excess of roasted substantially anhydrous and compact artificial higher oxid of manganese substantially free from bodies causing local action, being chemically uncombined with said carbon and having less combined oxygen than corresponds to the formula $MnO_2$.

5. In a galvanic cell, a depolarizing agent adapted for use in miniature batteries comprising finely-divided carbon and therewith admixed manganese depolarizing material comprising a roasted compact substantially anhydrous artificial higher oxid of manganese product and some lower oxid of manganese.

6. In a dry battery, a depolarizing agent adapted for use in miniature batteries, which agent comprises finely-divided graphite and therewith-incorporated manganese depolarizing material comprising roasted substantially anhydrous artificial higher oxid of manganese compound having approximately the formula $10MnO_2.MnO$.

7. In a dry battery, a depolarizing agent comprising finely-divided carbon and roasted substantially anhydrous artificial manganese peroxid and a lower oxid of manganese.

8. In a dry battery of the miniature type a depolarizing agent comprising finely-divided carbon and roasted substantially anhydrous and compact artificial manganese peroxid uncombined therewith.

9. In an unused dry battery of the miniature type of depolarizing agent comprising finely-divided carbon and substantially anhydrous but dense and compact slightly permeable highly active artificial manganese higher oxid depolarizing material containing a modicum of a manganous body and having a substantially greater utilizable depolarizing capacity than natural manganese peroxid but having less combined oxygen than corresponds to the formula $MnO_2$.

Signed at New York city, in the county of New York and State of New York, this 18th day of November, A. D. 1914.

MORDUCH L. KAPLAN.

Witnesses:
ARTHUR MARION,
CHAS. C. GILL.